United States Patent [19]
Paugh et al.

[11] 3,838,515
[45] Oct. 1, 1974

[54] ORTHODONTIC ARCH-WIRE CABLE
[75] Inventors: Edward C. Paugh, Hacienda Heights; Wilford A. Snead, West Covina, both of Calif.
[73] Assignee: Ormco Corporation, Glendora, Calif.
[22] Filed: June 6, 1973
[21] Appl. No.: 367,670

[52] U.S. Cl. .................................. 32/14 A
[51] Int. Cl. ............................... A61c 13/00
[58] Field of Search .......................... 32/14 A

[56] References Cited
UNITED STATES PATENTS
3,052,081 9/1962 Wallshein .................... 32/14 A
3,123,913 3/1964 Rubin ......................... 32/14 A Primary Examiner—Robert Peshock
Attorney, Agent, or Firm—Keith D. Beecher; Warren T. Jessup

[57] ABSTRACT

An orthodontic arch-wire cable having a non-circular cross section developed by a plurality of wire strands that are twisted together and individually deformed at selected wire strand regions.

4 Claims, 4 Drawing Figures

PATENTED OCT 1 1974

3,838,515

ORTHODONTIC ARCH-WIRE CABLE

BACKGROUND OF THE INVENTION

Orthodontics, as a branch of dentistry dealing with irregularities of the teeth and their correction, uses the application of predetermined and directed corrective mechanical forces to reposition irregular teeth to their proper position. The corrective forces can be developed by various orthodontic apparatus, such as orthodontic brackets in combination with a tensioned or torqued arch wire.

Arch wires, which are used in conjunction with the brackets on teeth, effect leveling, rotation and general alignment of the teeth. The use of spiral wound arch wire is well known in the prior art. See U.S. Pat. No. 3,052,081, 3,123,913 and 3,444,621. The advantage of a spiral wound arch-wire cable over a solid arch wire is that resiliency is much greater and malposed teeth are less painfully and more readily brought to a general preferred arch form. The load deflection rates of cables compared to solid arch wires of comparable diameters are well known and used to good advantage in requirements where flexure must be enhanced while maintaining equal tensile strength.

In orthodontic practice, bands with dimensionally slotted brackets are affixed to teeth and a dimensionally compatible arch wire, either round, square or rectangular, is formed into an arch, inserted and attached to individual brackets. Through wire memory forces, the teeth are moved bodily to a preferred arch form.

Arch wires fall into three categories:

1. Solid round - used during early stages of treatment for leveling and rotation. Round solid arches at this stage of treatment are limited in that resiliency is not great enough to allow attachment to severely malposed teeth. Secondly, due to the round cross-section's engagement in a rectangular bracket slot, no torque control can be exerted on a tooth. If the arch is permanently deformed to pick up a malposed tooth, the wire will be in a passive state and will not exert the required force 2. Spiral wound round - used during early stages of treatment for leveling and rotation. This arch is quite resilient and provides lower forces required to start movement of badly malposed teeth. The primary deficiencies of this arch are associated with a complete lack of torque control, insufficient force and unraveling.

3. Solid rectangular or square - used during latter stages of treatment where general alignment has been accomplished. There is full control over torque, rotation and angulation through an intimate fit relationship between the dimensional arch wire and bracket slot. The solid full-size rectangular or square wire has minimal resiliency and cannot be easily deformed from a true arch form without overstressing permanent bends.

OBJECTS OF THE INVENTION

Accordingly, it is an object of the invention to provide a new and improved arch-wire cable having a non-circular cross section.

It is an object of the invention to provide an arch-wire cable having a non-circular cross section developing increased resiliency with improved torque control.

It is a further object of the invention to provide an arch-wire cable having a non-circular cross section enhancing the development of controlled torque, rotation and angulation forces to bring malposed teeth to a preferred arch location.

SUMMARY OF THE INVENTION

Briefly, in accordance with the invention, an improved arch-wire cable is provided having a non-circular, e.g. generally rectangular, cross section that is developed by a plurality of wires or wire strands twisted together and individually deformed at selected regions to complement each adjacent wire strand and thereby develop the non-circular arch-wire cable cross section.

DETAILED DESCRIPTION OF THE EMBODIMENT OF THE INVENTION

Figure 1:
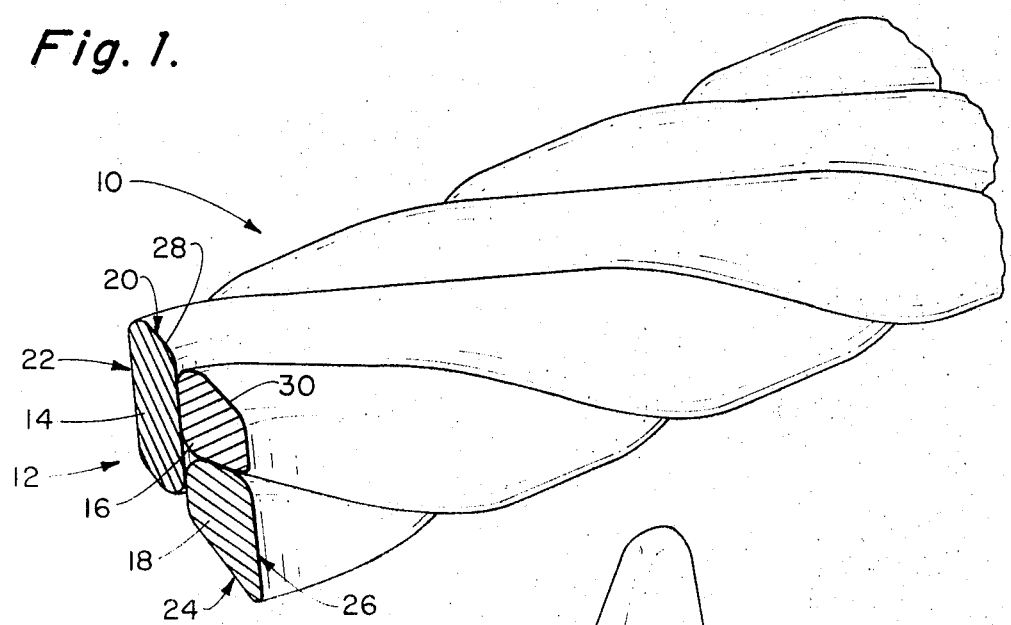
FIG. 1 is an enlarged perspective view, partly broken away, of the improved arch-wire cable of the invention.

Referring to FIG. 1, one arch-wire cable 10 formed in accordance with the invention has a non-circular cross section 12, in the form of a rectangle, developed by wires or wire strands 14, 16, and 18 helically twisted together along the cable longitudinal axis as illustrated. Each of the wire strands 14, 16, and 18 has an irregular cross section that complements the irregular cross sections of the adjacent strands thereby developing the desired non-circular cross section 12 of the arch-wire cable of the invention.

The wire strands 14, 16, and 18 of the arch-wire cable 10 of FIG. 1 are individually and permanently deformed by the application of suitable compressive forces. The compressive forces are directed generally inwardly at the selected cable outer regions as are generally defined by the plane surfaces 20, 22, 24, and 26 of the non-circular arch-wire cable 10. Thus, plane surface 20, for example, is developed by the deformed outer regions 28 and 30 of adjacent wire strands 14 and 16, respectively. Plane surfaces 22, 24, and 26 are similarly developed by the respective outer regions of the particular adjacent wire strands. It is contempated that the non-circular cross section 12 of the arch-wire cable 10 can be rectangular, and as desired, can be a square, although a rectangle is preferred. It is also contemplated, but not illustrated, that the non-circular cross section of the arch-wire cable of the invention can have other non-circular geometries, such as pentagonal, trapezoidal, or the like.

Figure 2:
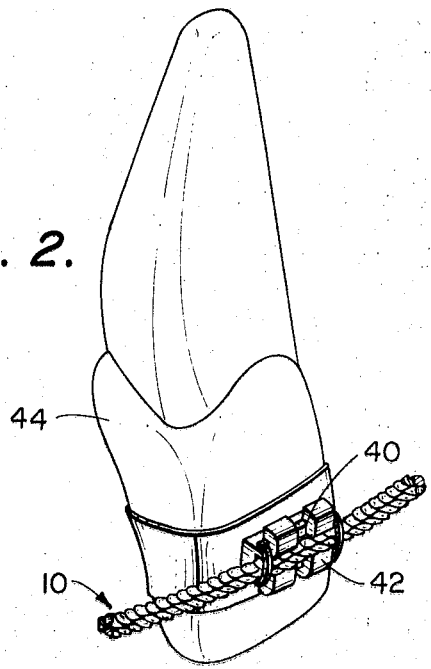
FIG. 2 is an enlarged perspective view of the arch-wire cable positioned in an orthodontic bracket banded to a tooth.

The arch-wire cable 10 of the invention as illustrated by FIG. 2 is readily formed in predetermined arch lenghs and then formed to an ideal arch configuration. The arch-wire cable 10 is positioned in an arch slot 40 of a conventional orthodontic bracket 42 that is suitably banded to a tooth 44. The noncircular cross section 12 of the arch-wire cable 10 preferably matches the non-circular arch slot 40 of the bracket. Upon attachment, the non-circular arch-wire cable of the invention provides the necessary forces of torque, rotation and angulation to bring malposed teeth to a preferred arch location.

Figure 3:
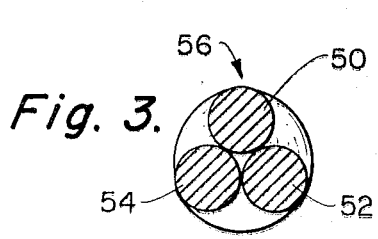
FIG. 3 is a sectional view of the arch-wire cable of the invention prior to deformation of the individual wire strands at selected wire strand regions.
Figure 4:
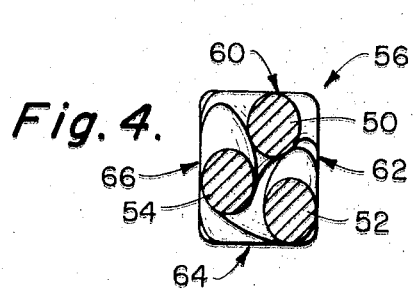
FIG. 4 is a sectional view of the arch wire cable of the invention after deformation of the individual wire strands at selected wire strand regions.

Referring to FIGS. 3 and 4, the non-circular arch-wire cable of the invention can be formed by twisting together individual wire strands 50, 52 and 54 into a conventional stranded spiral-wound cable 56 that has a circular cross section as shown by FIG. 3. Each of the strands 50, 52 and 54 also has a circular cross section in the spiral-wound cable. The circular cable 56 is next passed through suitably positioned wire rolls or dies that individually and permanently deform each of the wire strands 50, 52 and 54 of the cable to develop cable plane surfaces 60, 62, 64 and 66 as shown by FIG. 4. As is illustrated by FIGS. 1 and 4 the non-circular arch-wire cable of the invention can have either wire strands with non-circular cross sections, as illustrated by FIG. 1, or wire strands with circular cross sections, as illustrated by FIG. 4. However, the wire strands in each of the noncircular arch-wire cables 10 and 56 of the invention are individually and permanently deformed to develop the desired arch-wire cable of the invention having the non-circular cross section.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention.

What is claimed is:

1. An arch-wire cable having a non-circular cross section comprising:
    a plurality of wire strands, each having a non-circular cross section, twisted together along a longitudinal axis defined by the cable; and
    an outer region on each of said wire strands complementing adjacent wire strand outer regions so that substantially plane surfaces are defined thereby developing the desired non-circular archwire cable cross section.

2. The arch-wire cable of claim 1 in which said non-circular cross section is rectangular.

3. The arch-wire cable of claim 2 in which said rectangular cross-section is square.

4. The arch-wire cable of claim 1 in which each of said wire strands is permanently deformed to said non-circular cross section.

* * * * *